United States Patent [19]

Pallini, Jr. et al.

[11] Patent Number: 4,603,886
[45] Date of Patent: Aug. 5, 1986

[54] SNAP TYPE PIPE CONNECTOR

[75] Inventors: Joseph W. Pallini, Jr., Houston, Tex.; David J. Rohweller, Ventura, Calif.

[73] Assignee: Vetco Offshore, Inc., Ventura, Calif.

[21] Appl. No.: 592,508

[22] Filed: Mar. 26, 1984

[51] Int. Cl.[4] ............................................. F16L 55/00
[52] U.S. Cl. ...................................... 285/24; 285/27; 285/18; 285/321; 285/308
[58] Field of Search ................. 285/321, 24, 308, 141, 285/330, 347, 403, 27, 18

[56] References Cited

U.S. PATENT DOCUMENTS

| | | | |
|---|---|---|---|
| 1,337,427 | 4/1920 | Beach | 285/330 X |
| 3,297,344 | 1/1967 | Hanes | 285/403 X |
| 3,345,085 | 10/1967 | Hanes | |
| 3,455,578 | 7/1969 | Hanes | 285/308 X |
| 3,718,350 | 2/1973 | Klein | 285/321 X |
| 3,841,671 | 10/1974 | Walker | 285/321 X |
| 4,124,233 | 11/1978 | Ahlstone | 285/321 X |
| 4,209,193 | 6/1980 | Ahlstone | 285/321 X |
| 4,240,654 | 12/1980 | Gladieux | 285/321 X |
| 4,311,328 | 1/1982 | Truchet | 285/308 |

Primary Examiner—Cornelius J. Husar
Assistant Examiner—Todd G. Williams
Attorney, Agent, or Firm—Edward L. Kochey, Jr.

[57] ABSTRACT

A snap type pin and box connector. A plurality of box diameters 24, 28, 32 interact with a plurality of pin diameters 36, 40, 44, 48 and 50 to produce a minimum clearance at an intermediate location 28, 44. The box load shoulder 56 is chamfered 54, as is a portion K of the split lock ring 14 adjacent to the split.

18 Claims, 5 Drawing Figures

SNAP TYPE PIPE CONNECTOR

BACKGROUND OF THE INVENTION

The invention relates to pipe connectors, and in particular to large connectors in the order of 30 inches in diameter of the snap ring type.

Diffulty is often encountered in connecting sections of pipes together as pipe is lowered from a floating platform toward a subsea wellhead. Snap type connectors such as described in U.S. Pat. No. 3,345,085 to James W. E. Hanes have been used. These permit a certain amount of misalignment when stabbing one joint into the other, and provide a fast makeup which is important because of the high cost of operating floating drilling systems.

The same Patent also shows a method of using screws in a box to squeeze the lock ring, and to facilitate disconnection of the joint as required. difficulty has, however, been experienced because of the limitations on stabbing angle permitted by that joint, and also some difficulties have been experienced in attempting to disengage the joint.

The present invention accordingly provides a connector with improved stabbing characteristics and better release characteristics, while retaining high strength of the connector.

SUMMARY OF THE INVENTION

A pin and box snap type connector has a plurality of stepped cylindrical diameters, thereby facilitating stabbing of the connector. The clearance between the diameters is minimum at an intermediate location. Larger clearance on each side to this intermediate location allows a greater stabbing angle.

This close clearance at the intermediate location acts as a centralizer during disassembly. It limits the shifting of the pin within the box under the influence of the release screws. In turn, this avoids hang up of the locking ring on the adjacent box surface.

The edge of the box load surface is slightly chamfered, thereby further facilitating release by avoiding hangup of the ring. Furthermore, the edge of the split lock ring is chamfered for a limited distance from the split.

The connector accordingly may be easily stabbed, and alsdo easily and reliably released.

DESCRIPTION OF THE PREFERRED EMBODIMENT

Figure 1:
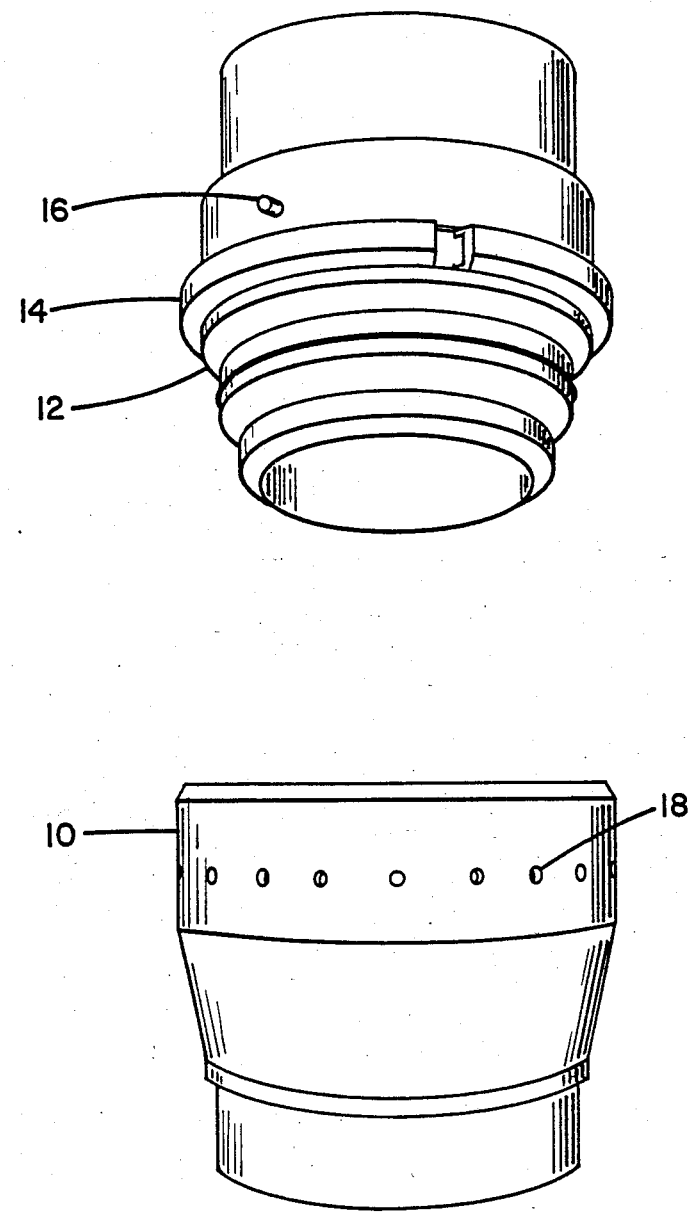
FIG. 1 is a side elevation of the pin and box connector.

FIG. 1 illustrates generally the connector with box 10 and pin 12. The pin carries a split lock ring 14, and also includes an alignment stud 16. The only purpose for the alignment stud is also to prevent rotation of the connector after assembly.

A plurality of screws 18 are located within threaded openings in the box for the purpose of compressing ring 14 when it is desired that the connector be released.

The described connector is for 30 inch pipe. It is generally useful in the range of 20 to 48 inches with the described diametrical clearances being the same within the size range.

The box 10 has a load shoulder 20 for the purpose of lifting the connector and string of pipe to which it is attached. It has at the outboard end a flared opening 22 at 20° from the vertical. Adjacent to the outboard end it has a first cylindrical inside diameter portion 24 extending down to lock ring groove 26. It is followed thereafter by an intermediate cylindrical inside diameter portion 28 of lesser diameter than the first inside diameter portion. Following this, toward the inboard end is a tapered section 30 at 10° from the vertical, and a final last cylindrical inside diameter portion 32 extending to the upwardly facing internal landing shoulder 34.

The pin 12 has at least three, and preferably five different cylindrical outside diameter portions. The first, intermediate and last cylindrical outside diameter portions are essential, with the addition of the fourth and fifth being preferable. The first and maximum outside diameter portion 36 is located at the inboard end extending down to a lock ring groove 38. Immediately below this lock ring groove is a fourth cylindrical outside diameter portion 40 of lesser diameter.

A 20° taper 42 connects this to an intermediate and lesser cylindrical outside diameter portion 44 which extends to an O-ring groove 46. Immediately below this O-ring groove is a fifth cylindrical outside diameter portion 48 which is connected by a 10° taper 51 to a last cylindrical outside diameter portion 50 which extends to the nose of the pin.

Dimension A is the difference in radial dimension between the diameter of surface 44 inboard of the O ring groove, and surface 48 of the outboard of the O ring groove. This difference is 0.02 inches, and on the diameter the clearance should be in the range between 0.03 and 0.09 inches. This retains sufficiently close clearance for the O ring to operate satisfactorily, but decreases any chance of the connector hanging up on this edge during the stabbing operation. The difference between surface 48 and surface 50 illustrated by dimension B is 0.3 inches, and on the diameter should be in the range between 0.5 and 1.0 inches.

Figure 2:
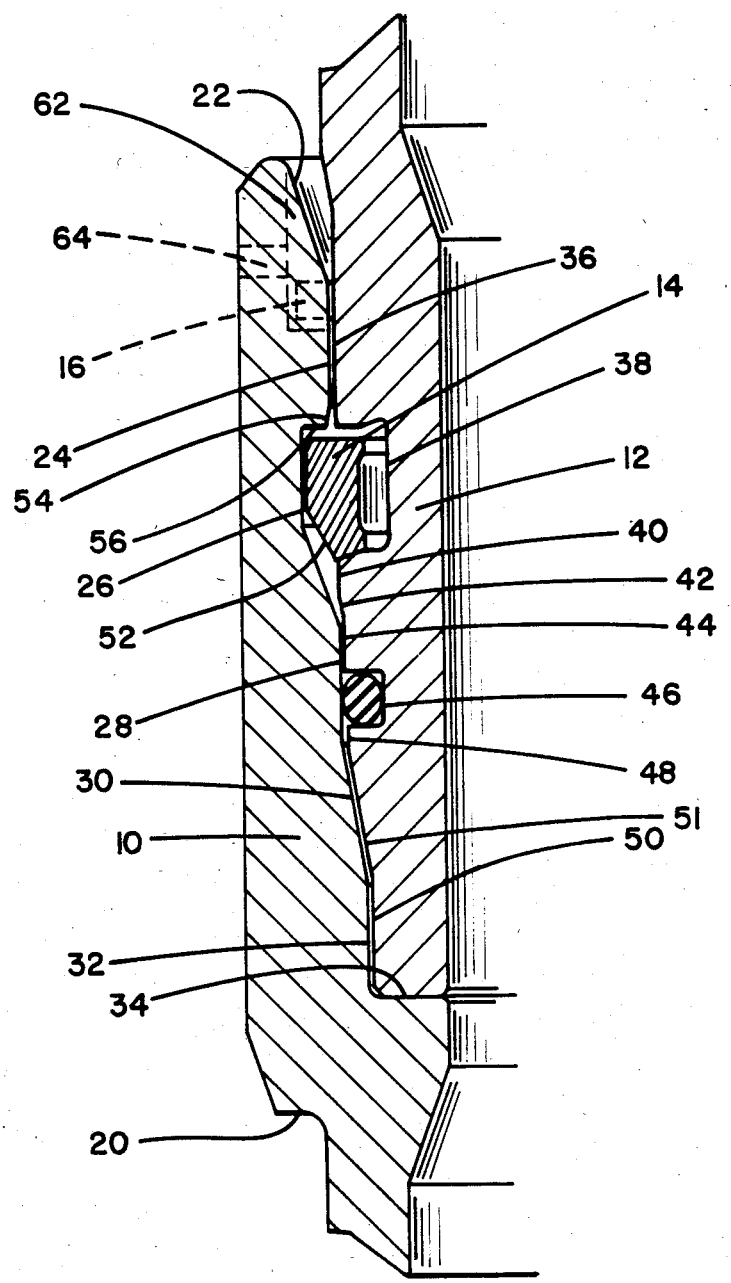
FIG. 2 is a detailed section through a portion of the madeup joint.
Figure 3:
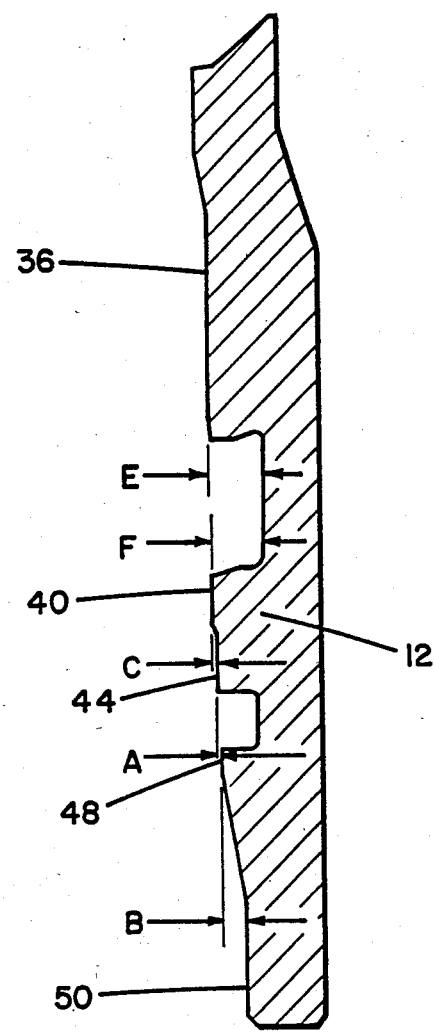
FIG. 3 is a detailed section of the pin member.
Figure 5:
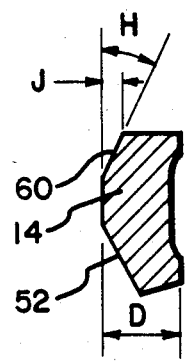
FIG. 5 is a sectional view of the lock ring near the split and showing a special chamfer.
Figure 4:
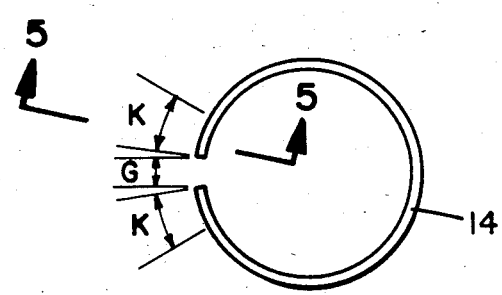
FIG. 4 is a planned view of the lock ring.

There is also a tapered step between surface 40, and 44 shown by dimension C of 0.09 inches which on the diameter should be in the range between 0.15 and 0.25 inches. Ths provides an increased tapered shape for the overall connector, thereby facilitatig stabbing at an angle while still maintaining the maximum load bearing surface against lock ring 14. Ring 14 is a split outwardly biased locking ring so it naturally tends to spring out into the position illustrated in FIG. 2. During the stabbing operation it is urged inwardly by its lowered tapered surface 52, which is at 30° from the vertical interacting with surface 22. Ths compresses the ring within the pin groove 38. When it reaches the elevation of box lock ring groove 26 it automatically snaps out.

For disassembly the ring is recompressed into the groove by actuating ¾ inch diameter screws 18. This compresses the split ring 14 into groove 38 so that the pin may be removed. To facilitate this there is a chamfer 54 of 15° from he vertical around the iner periphery of the box adjacent the load bearig surface 56. This chamfer should be a maximum of about 0.1 inches, and preferably between 0.04 and 0.08 inches so as to facilitate the sliding of the locking ring on disassembly but without removing excessive load bearing surface.

The radial thickness D of the locking ring, which is compressed into the groove of dimension E, is such that the compressed outside diamter of the ring is less than the inside diameter of the box at 24. The depth of the ring D is however greater than dimension F, which is the depth of the groove with respect to the second diameter 40. Accordingly, when release screws 18 compress the ring to the full extent there is no possibility that these release will hang up on surface 40 during disassembly.

Dimension G representing the size of the split in lock ring 14 which in its compressed condition exceeds ⅜ inches which is the diameter of the release screws.

Accordingly with the split being equal to or greater than the pin diameter, there is no possibility of a release screw moving within the opening, and therby blocking compression of the split ring.

When a split ring is compressed, the maximum bending moment occurs at the location in the ring diagonally opposite the split. Since the bending moment then varies as it moves around the ring toward this split location there is a probability that the ring, even though compressed, is not fully circular but extends outwardly adjacent the split. To avoid interference on disassemby because of this phenomenon a chamfer 60 is located near the split on the outer edge of the split ring with an angle H of 15° and a maximum depth of chamfer J of 0.10 and preferably 0.08 inches. A full depth of chamfer is used at the cut, continuing around the ring with the chamfer diminishing to 0 through the dimension K, which is an arc of 20° to 40° around the circumference of the ring. This represents the maximum dimension between releases screws in the box.

In order to prevent rotation of the connectors after assembly, a stud 16 has been used in the past interacting with a V shaped cut through the end of the box. Since, however, in bending the end of the box is a highly loaded member the stress concentration of the through cut is detrimental. A reduced depth cut has been used which does not pass through the entire surface of the box, but it has been found very difficult to properly align the pin and box since this cannot be readily seen. Accordingly, in addition to the V shaped partial cut 62 a round hold 64 is provided at this location. This provides the ability to easily locate the V slot, and also visual access to determine whether the joint has been fully assembled and therefore locked.

We claim:

1. A pin and box snap type pipe connector for large diameter pipe comprising:

a box member having a first cylindrical inside diameter portion adjacent the outboard end of said box member, an intermediate cylindrical inside diamter portion of lesser diameter than said first inside diamter portion at an intermediate location, and a last cylindrical inside diameter porton of still lesser diameter at the inboard end of said box member, an internal landing shoulder at the inboard end of said box member, said box member having an internal circumferential lock ring groove outboard of said intermediate inside diameter portion and adapted to receive a lock ring;

a pin member adapted to fit within said box member and having a first cylindrical outside diameter portion adjacent the inboard end of said pin member, an intermediate cylindrical outside diameter portion of lesser diameter than said first outside diameter at an intermediate location, a last cylindrical outside diameter portion of a lesser diameter than said intermediate outside diameter adjacent the outboard end of said pin member, an end face for abutting said box shoulder;

an external circumferential lock ring groove in said pin between said first and said outside intermediate diameter portions;

an outwardly biased split lock ring sized to fit within said lock ring grooves;

means for contracting said lock ring to permit release;

there being a first, intermediate, and last clearance between corresponding cylindrical portions of said pin and box when said end face abuts said shoulder; and the diameters sized such that said intermediate clearance is less than both said first and last clearances.

2. A pipe connector as in claim 1: the compressed outside diameter of said lock ring being greater than the outside diameter of said pin immediately outboard of said lock ring groove.

3. A pin and box snap type pipe connector for large diameter pipe comprising:

a box member having a first cylindrical inside diameter portion adjacent the outboard end of said box member, an intermediate cylindrical inside diameter portion of lesser diameter than said first inside diameter portion at an intermediate location, and a last cylindrical inside diameter portion of still lesser diameter at the inboard end of said box member, an internal landing shoulder at the inboard end of said box member, said box member having an internal circumferential lock ring groove outbard of said intermediate inside diameter portion and adapted to receive a lock ring;

a pin member adapted to fit within said box member and having a first cylindrical outside diameter portion adjacent the inboard end of said pin member, an intermediate cylindrical outside diameter portion of lesser diameter than said first outside diameter at an intermediate location, a last cylindrical outside diameter portion of a lesser diameter than said intermediate outside diameter adjacent the outboard end of said pin member, an end face for abutting said box shoulder;

an external circumferential lock ring groove in said pin between said first and said intermediate outside diameter portions;

an outwardly biased split lock ring sized to fit within said lock ring grooves, the compressed outside diameter of said lock ring being greater than the outside diameter of said pin immediately outboard of said lock ring groove;

means for contracting said lock ring to permit release;

there being a first, intermediate and last clearance between corresponding cylindrical portions of said pin and box when said end face abuts said shoulder;

the diameters sized such that said intermediate clearance is less than both said first and last clearances;

said pin having a fourth cylindrical outside diameter portion between said lock ring groove, and said intermediate outside diameter portion being of a diameter less than the first outside diameter and greater than the intermediate diameter, but smaller than the compressed outside diameter of said lock ring.

4. A pin and box snap type pipe connector for large diameter pipe comprising:

a box member having a first cylindrical inside diameter portion adjacent the outboard end of said box member, an intermediate cylindrical inside diameter portion of lesser diameter than said first inside diameter portion at an intermediate location, and a last cylindrical inside diameter portion of still lesser diameter at the inboard end of said box member, an internal landing shoulder at the inboard end of said box member, said box member having an internal circumfereential lock ring groove outbard of said intermediate inside diameter portion and adapted to receive a lock ring;

a pin member adapted to fit within said box member and having a first cylindrical outside diameter portion adjacent the inboard end of said pin member, an intermediate cylindrical outside diameter portion of lesser diameter than said first outside diameter at an intermediate location, a last cylindrical outside diameter portion of a lesser diameter than said intermediate outside diameter adjacet the outboard end of said pin member, an end face for abutting said box shoulder;

an external circumferential lock ring groove in said pin between said first and said intermediate outside diameter portions;

an outwardly biased split lock ring sized to fit within said lock ring grooves, means for contracting said lock ring to permit release;

there being a first, intermediate and last clearance between corresponding cylindrical portions of said pin and box when said end face abuts said shoulder; the diameter sized such that said intermediate clearance is less than both said first and last clearances;

said box ring groove having an inboard facing load shoulder, the inner periphery of said box immediately outboard of said groove being tapered at 15 degrees with respect to the axis of the box to a maximum depth of 0.04 to 0.08 inches.

5. A pipe connector as in claim 1: an external circumferential O-ring groove in said pin between said intermediate and last outside diameter portions; an O ring within said O ring groove.

6. A pipe connector as in claim 5: said pin having a fifth cylindrical outside diameter portion located between said O ring groove and said last outside diameter portion, of a diameter less than said intermediate outside diameter and greater than said last outside diameter portions.

7. A pipe connector as in claim 1: said means for contracting said lock ring comprising a plurality of release screws located around the periphery of said box: the split in said lock ring when said lock ring is in the compressed condition being greater than the diameter of one of said release screws.

8. A pipe connector as in claim 7: said locking ring having a chamfer immediately adjacent the split, said chamber having a maximum depth from the outside edge of 0.10 inches, and approximately a 15° taper vertically along the outside edge, said chamfer continuing from the split at a reducing depth for a circumferential distance equal on each side of the split to the maximum distance between the release screws of said box.

9. A pipe connector as in claim 1: having a radially extending alignment stud located on said first diameter portion of said pin; said box having a V shaped cut from the outboard end of the box in its inner surface only for receiving and aligning with said stud; said box also having a circular hole through the remainder of the box at the location of said V cut.

10. A pipe connector as in claim 3: said box ring groove having an inboard facing load shoulder, the inner periphery of said box immediately outboard of said groove being tapered at 15° with respect to the axis of the box to a maximum depth of 0.04 to 0.08 inches.

11. A pipe connector as in claim 10: said means for contracting said lock ring comprising a plurality of release screws located around the periphery of said box: the split in said lock ring when said lock ring is in the compressed condition being greater than the diameter of one of said release screws.

12. A pipe connector as in claim 11: said locking ring having a chamfer immediately adjacent the split, said chamfer having a maximum depth from the outside edge of 0.10 inches, and approximately a 15° taper vertically along the outside edge, said chamfer continuing from the split at a reducing depth for a circumferential distance equal on each side of the split to the maximum distance between the release screws of said box.

13. A pipe connector as in claim 12: having a radially extending alignment stud located on said first outside diameter portion of said pin; said box having a V shaped cut from the outboard end of the box in its inner surface only for receiving and aligning with said stud; said box also having a circular hole through the remainder of the box at the location of said V cut.

14. A pipe connector as in claim 10: an external circumferential O ring groove in said pin between said intermediate and last outside diameter portions; an O ring within said O ring groove; said pin having a fifth cylindrical outside diameter portion between said O ring groove and said last outside diameter portion, of an outside diameter between said intermediate and last outside portions.

15. A pipe connector as in claim 14: said means for contracting said lock ring comprising a plurality of release screws locating around the periphery of said box: the split in said lock ring when said lock ring is in the compressed condition being greater than the diameter of one of said release screws.

16. A pipe connector as in claim 15: said locking ring having a chamfer immediately adjacent the split, said chamfer having a maximum depth from the outside edge of 0.10 inches, and approximately a 15° taper vertically along the outside edge, said chamfer continuing from the split at a reducing depth for a circumferential distance equal on each side of the split to the maximum distance between the release screws of said box.

17. A pipe connector as in claim 16: having a radially extending alignment stud located on said first outside diameter portion of said pin; said box having a V shaped cut from the outboard end of the box in its inner surface only for receiving and aligning with said stud; said box also having a circular hole through the remainder of the box at the location of said V cut.

18. A pipe connector as in claim 6: the difference between said intermediate and fifth outside diameters being between 0.03 and 0.09 inches.

* * * * *